Jan. 12, 1960   W. G. PAGDIN   2,920,916
APPARATUS FOR HANDLING MATERIALS
Filed Feb. 17, 1956   2 Sheets-Sheet 2
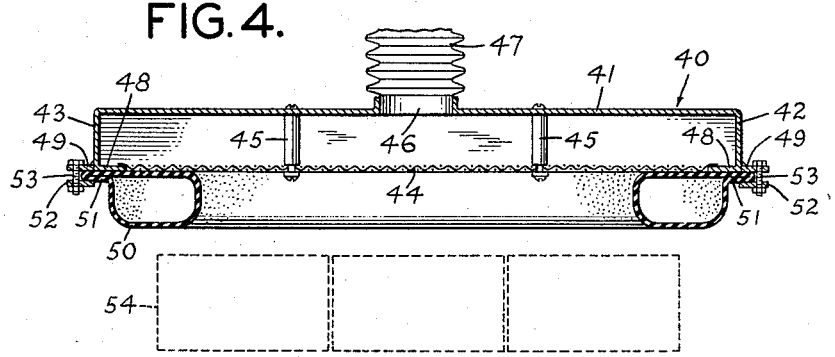
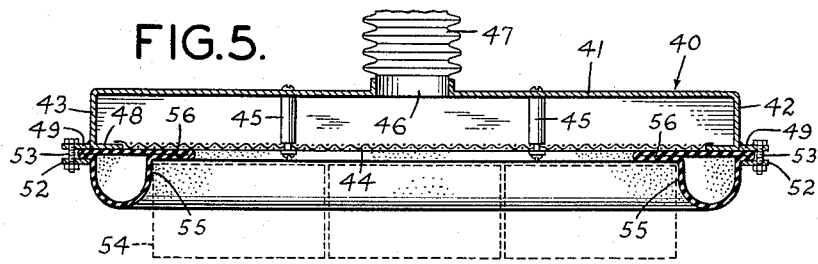
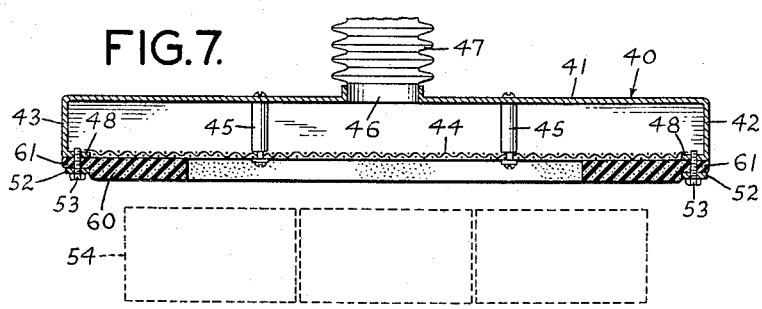
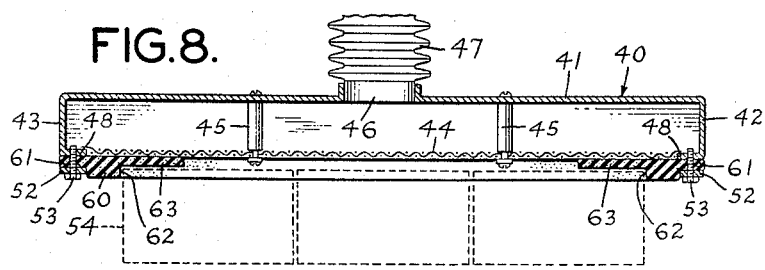

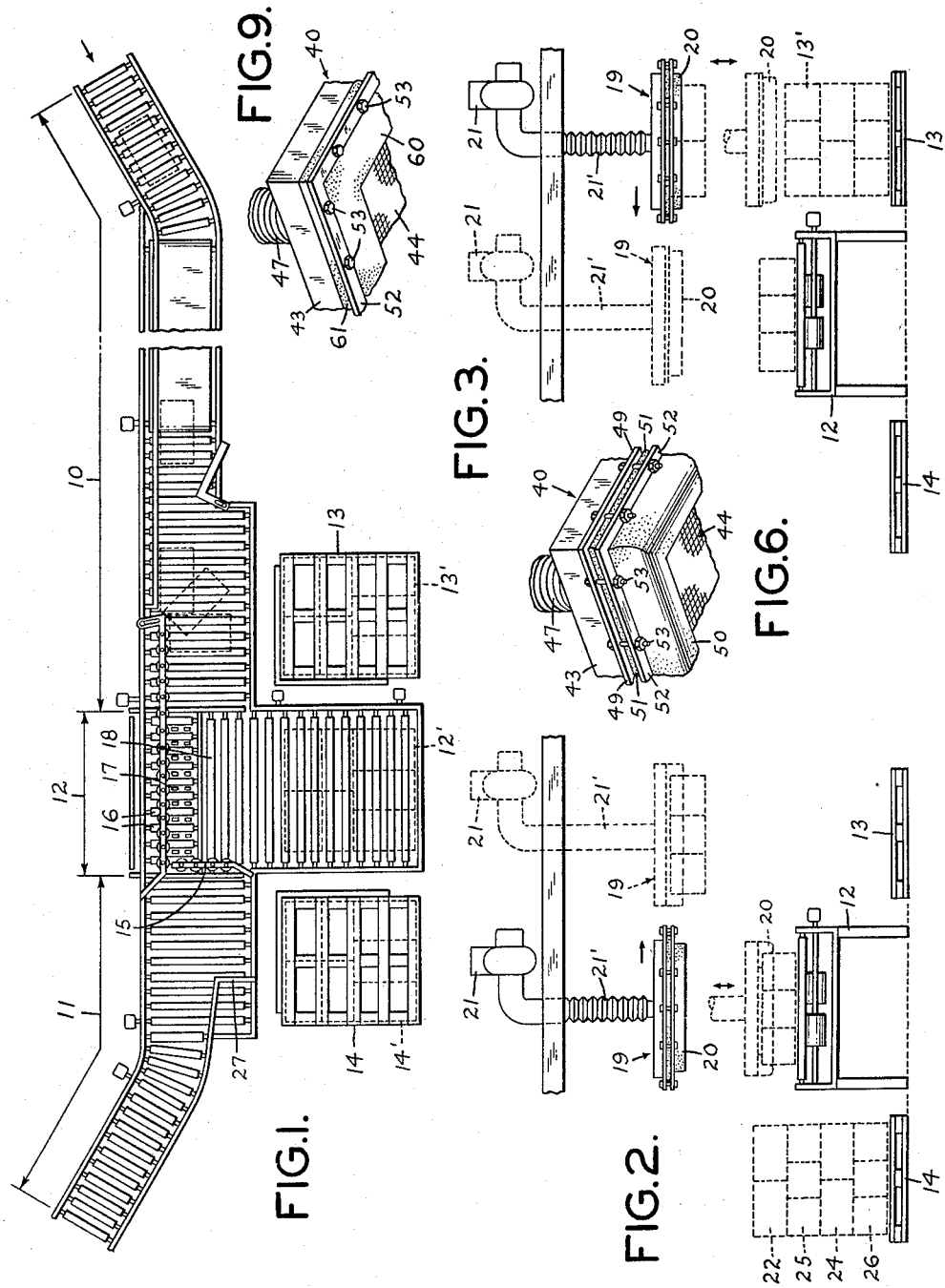

United States Patent Office 2,920,916
Patented Jan. 12, 1960

2,920,916

APPARATUS FOR HANDLING MATERIALS

William G. Pagdin, Little Silver, N.J., assignor to P. Ballantine & Sons, Newark, N.J., a corporation of New Jersey Application February 17, 1956, Serial No. 566,250

3 Claims. (Cl. 294—64)

The present invention relates to apparatus for handling materials and more particularly to apparatus for loading and unloading cartons or other units in groups onto or from a pallet or other portable platform.

In Wahl and Winters United States Patent 2,716,497, issued August 30, 1955, there is described a suction type palletizing and depalletizing machine. The present invention is concerned with a machine of this character and particularly with an improved suction head which is especially adapted for the handling of certain types of loads. For example, cartons having fluted edges or units such as irregular castings may be handled expeditiously by the suction head of the invention.

A principal object of the invention has been the provision of a novel and improved suction head for the handling of relatively large or heavy units (such as cartons of beer or ale) in groups.

A further object of the invention has been the provision of a novel and improved suction head for the handling of units having irregularly shaped top edges.

A feature of the invention has been the provision of a sealing arrangement for use with a suction head and which combines vertical and horizontal sealing components.

Other and further objects, features and advantages of the invention will appear more fully from the following description.

In accordance with the invention, there is provided, in an apparatus for transferring simultaneously a plurality of units forming a tier, a hollow suction head for gripping a tier and comprising a rigid upper portion and a compressible sealing device depending from the upper portion and being adapted, when compressed by contact with the units forming the periphery of a tier, to engage in substantially air tight manner at least the upper portions of the sides of the units forming the periphery of a tier and the outer portions of the tops of the units forming the periphery of a tier thereby to provide combined vertical and horizontal sealing action adjacent the upper edges of the units forming the periphery of a tier. The rigid upper portion, the compressible sealing device and the tops of the units forming a tier define a suction chamber from which air may be evacuated so that the tier will be supported by the differential in air pressure acting thereon.

The invention will now be described in greater detail with reference to the appended drawings in which:

Fig. 1 is a schematic plan view of a suitable palletizing and depalletizing arrangement;

Fig. 2 is a schematic elevational view illustrating a suitable loading or palletizing operation;

Fig. 3 is a schematic elevational view illustrating a suitable unloading or depalletizing operation;

Fig. 4 is a cross-sectional view through a suction head of the type shown in Figs. 2 and 3 and illustrates one form of compressible sealing device according to the invention;

Fig. 5 is a cross-sectional view similar to Fig. 4 and illustrating the sealing device of Fig. 4 in engagement with a tier of cartons;

Fig. 6 illustrates a suitable corner construction for the sealing device of Figs. 4 and 5;

Fig. 7 is a cross-sectional view through a suction head of the type shown in Figs. 2 and 3 and illustrates another form of compressible sealing device according to the invention;

Fig. 8 is a cross-sectional view similar to Fig. 7 and illustrating the sealing device of Fig. 7 in engagement with a tier of cartons; and Fig. 9 illustrates a suitable corner construction for the sealing device of Figs. 7 and 8.

Referring now to the drawings, and more particularly to Fig. 1, there is shown a delivery conveyor system 10, a discharge conveyor system 11, an accumulator table 12 and pallets 13 and 14. The detailed construction and operation of a system such as is illustrated in Fig. 1 is set forth in the aforementioned Wahl and Winters patent. Briefly stated, cartons or other units, e.g., bags, boxes, castings, etc., are advanced along the conveyor 10 and onto the rear of the accumulator 12. When a complete row is formed at the rear of the accumulator 12, this row is advanced toward the front of the accumulator 12. When a second complete row is formed in the rear of the accumulator 12, such second row is likewise advanced toward the front of the accumulator. The units contained in one or more rows may be rotated 90° in order to form a desired pattern as shown in dotted lines at 12', 13' and 14'. When the complete tier is formed in the front of the accumulator table, e.g., three rows as illustrated at 12', the tier is ready to be moved to either of the pallets 13 or 14.

In the formation of a tier on the accumulator 12, independent units advanced onto the rear of the accumulator 12 are carried toward a stop member 15 by powered rollers 16. When a complete row is formed, skate wheels 17 may be elevated to cause the row to advance onto powered or gravity rolls 18 which carry the row forward on the accumulator table.

When a complete tier has been formed on the front of the accumulator table 12, a suction head 19 (Fig. 2) is lowered to the position shown in dotted lines over the accumulator and in which a depending sealing device or member 20 encircles the periphery of the tier. Air is then evacuated from the interior of the suction head by means of a blower 21 which communicates with the suction head through a flexible tube 21'. When the suction head 19 is raised, the differential in air pressure acting on the units forming the tier causes the latter to travel with the suction head which deposits the tier on one of the pallets 13 and 14. Additional tiers may be deposited one on top of the other until a complete pallet load is achieved at which time loading will be transferred to the other pallet. If desired, the pattern of units forming a tier may be varied to provide an interlocking stack. Thus in Fig. 2, the tiers 22 and 24 have a different pattern than the tiers 25 and 26. When a tier has reached its desired position on or over the pallet, the suction is released and the head returned to the full line position preparatory to picking up another tier.

In the depalletizing or unloading operation, a loaded pallet is unloaded by the suction head 19 which grasps a tier, raises it, moves it to a position over the front of the accumulator table 12 and lowers it onto the accumulator table 12. Suction is then released and the suction head 19 returns to pick up the next tier. In the meantime, the deposited tier is moved to the rear of the table under action of the powered rollers 18 and the rows are discharged one by one onto the conveyor section 11 or, if desired, onto the conveyor section 10. For discharging onto the conveyor section 11, the stop member 15 will of course be removed. To facilitate the discharge of the rows one by one, stop members (not shown) may be interposed in the path of the second and subsequent rows to stop their movement until preceding rows have been discharged. If desired, means such as the corner member 27 may be provided to turn units oriented in one direction so that all units carried on the discharge conveyor 11 will be similarly oriented.

Referring now to Fig. 4, the suction head of the invention may comprise a rigid hollow top member 40 which may be made of wood, sheet metal or any other suitable material. The member 40 has a top 41, sides 42 and 43 and a front and back (not shown) defining a chamber somewhat larger in area than the size of the tiers to be grasped. The bottom of the top member 40 is formed as a perforated plate or screen 44 which has passages adapted for the free passage of air therethrough. A number of spacers 45 may be provided to maintain the screen 44 at a suitable distance from the top 41. The top 41 is provided with an aperture 46 into which extends a flexible tube 47, the other end of which may communicate with the source of suction, e.g., the blower 21. If desired, the blower 21 may be mounted directly on the suction head, in which case the aperture 21 will communicate directly with the blower intake.

The screen 44 is affixed adjacent the periphery of the suction head to an inwardly extending flange portion 48 which may be integral with the walls 42 and 43 and also with the front and back walls. These walls are likewise provided with an outwardly extending flange portion 49. A depending sealing member 50 extends around the periphery of the suction head beneath the screen 44. As shown in Fig. 4, an outer portion 51 of the sealing member 50 may be pinched between the flanges 48 and 49 on the top and a plate 52 at the bottom. Suitable bolts 53 acting in holes provided in the flange 49 and the plate 52 may hold the sealing member 50 rigidly in place. The sealing member 50, which extends completely around the periphery of the suction head, is an air tight tube formed from a resilient flexible material such as rubber or the like and contains air at either atmospheric or superatmospheric pressure. Preferably, the sealing member 50 is a thin-walled rubber tube.

When the suction head 40 comes into contact with a tier of cartons or other units 54, the sealing member 50 is deformed as shown in Fig. 5, i.e., an inner portion thereof is pinched or compressed between the tops of the units forming the periphery of the tier and the screen or perforated plate 44. The outer portion of the sealing member 50 is forced into a generally U-shaped cross section in which at least a portion 55 is in intimate contact with the upper portion of the sides of the units forming the periphery of the tier. Compression of the inner portion of the member 50 causes the air pressure in the outer portion to increase, thus aiding in establishing the vertical seal along the tube wall 55. When air is evacuated from within the suction head, a tight seal is made between the portion or wall 55 and the corresponding sides of the units and between horizontal portions of the sealing member 50 and the corresponding portions of the tops of the units. Thus both horizontal sealing and vertical sealing is achieved. When the suction head is raised, the differential between the reduced air pressure acting through the openings in the screen 44 on the tops of the units forming the tier and the atmospheric pressure acting on the bottoms and lower sides of these units maintains the units in position beneath the suction head. So long as this pressure differential is sufficiently great the suction head may be moved and stopped relatively rapidly without loss of the load. The tight sealing action achieved by intimate contact under pressure of the sealing member 50 and the adjacent tops and sides of the units forming the periphery of a tier will accommodate units having irregular upper edges since the seal will be made around these irregularities.

As will be evident from Fig. 5, contact of the cartons forming the periphery of the tier with the sealing member 50 causes the air in the inner portion of the sealing member to be squeezed into the outer or resultant U-shaped portion thereof increasing the air pressure in this outer portion and causing a definite pressure seal to take place in a vertical plane. In order to reduce the suction power requirements to a commercially feasible level when handling tiers weighing up to 500 pounds or more, a good seal must be established and maintained. Since the seal in this case is aided by pressure contact in vertical and horizontal planes, maintenance of the seal is facilitated.

The suction head of Fig. 7 is similar to that of Fig. 4. However, in this case, the sealing member 60 is realized as a soft, sponge rubber or similar material block which extends around the periphery of the suction head beneath the screen 44. An outer end 61 of the block 60 is pinched between the flange 48 and the plate 52 by bolts 53. It will be observed that the flange 49 has been omitted from the Fig. 7 embodiment of the invention. It will be understood that this flange could be provided in Fig. 7 if desired and that similarly, the flange 49 of Fig. 4 could be omitted and the portion 51 of the sealing member 50 pinched as shown in Fig. 7.

The sponge rubber block 60, as well as the tube 50 preferably have sufficient rigidity to remain in position beneath the screen 44 when the suction head is not in contact with a tier. However, the sealing member may drop slightly below the screen provided contact with a tier restores it to position underneath the screen 44. As shown in Fig. 8 when the suction head comes down, the rubber trapped between the top of the cartons forming the periphery of a tier and the bottom of the screen 44 is compressed sufficiently to form a pressure seal in the vertical plane along the edge 62 and a pressure seal in the horizontal plane along the edge 63. The sealing action provided by compression of the sponge rubber block 60 is equivalent to the sealing action provided by compression and deformation of the tube 50.

While the invention has been described in connection with specific embodiments thereof and in a specific use, various modifications thereof will occur to those skilled in the art without departing from the spirit and scope of the invention as set forth in the appended claims.

What is claimed is:

1. In apparatus for transferring simultaneously a plurality of units forming a tier, a hollow suction head for gripping a tier comprising a hollow chamber having top and side walls and an open bottom, spacing means affixed to said walls of said hollow chamber and extending across said open bottom and adapted to lie adjacent the tops of the units forming a tier, said spacing means having openings therein for the free passage of air therethrough, and a compressible and deformable sealing device affixed to and depending from said side walls beneath said spacing means adjacent to the periphery of said open bottom and extending throughout the periphery of said open bottom, said sealing device normally having a substantially undeformed cross section but being adapted, when compressed and deformed between said spacing means and the units forming the periphery of a tier, to form substantially vertical and substantially horizontal sealing surfaces arranged to engage in substantially airtight manner at least the upper portions of the sides of the units forming the periphery of said tier and the outer portions of the tops of the units forming the periphery of said tier thereby to provide combined vertical and horizontal sealing action adjacent the upper edges of the units forming the periphery of said tier, said hollow chamber, said compressible sealing device and the tops of the units forming said tier defining a suction chamber from which air may be evacuated so that said tier will be supported by the differential in air pressure acting thereon.

2. In apparatus for transferring simultaneouly a plurality of units forming a tier, a hollow suction head for gripping a tier comprising a hollow chamber having top and side walls and an open bottom, spacing means affixed to said walls of said hollow chamber and extending across said open bottom and adapted to lie adjacent the tops of the units forming a tier, said spacing means having openings therein for the free passage of air therethrough, and a compressible and deformable airtight tube affixed to and depending from said side walls beneath said spacing means and adjacent to the periphery of said open bottom, said tube extending throughout the periphery of said open bottom and having a substantially oval cross section but being adapted, when compressed and deformed between said spacing means and the units forming the periphery of a tier, to form substantially vertical and substantially horizontal sealing surfaces arranged to engage in substantially airtight manner at least the upper portions of the sides of the units forming the periphery of said tier and the outer portions of the tops of the units forming the periphery of said tier thereby to provide combined vertical and horizontal sealing action adjacent the upper edges of the units forming the periphery of said tier, said hollow chamber, said compressible air-tight tube and the tops of the units forming said tier defining a suction chamber from which air may be evacuated so that said tier will be supported by the differential in air pressure acting thereon.

3. In apparatus for transferring simultaneously a plurality of units forming a tier, a hollow suction head for gripping a tier comprising a hollow chamber having top and side walls and an open bottom, spacing means affixed to said walls of said hollow chamber and extending across said open bottom and adapted to lie adjacent the tops of the units forming a tier, said spacing means having openings therein for the free passage of air therethrough, and a compressible and deformable rubber block depending from said side walls beneath said spacing means and adjacent to the periphery of said open bottom, said block extending throughout the periphery of said open bottom and normally having a substantially rectangular cross section but being adapted, when an inner portion thereof is compressed and deformed between said spacing means and the units forming the periphery of a tier, to form substantially vertical and substantially horizontal sealing surfaces arranged to engage in substantially air tight manner at least the upper portions of the sides of the units forming the periphery of said tier and the outer portions of the tops of the units forming the periphery of said tier thereby to provide combined vertical and horizontal sealing action adjacent the upper edges of the units forming the periphery of said tier, said hollow chamber, said compressible rubber block and the tops of the units forming said tier defining a suction chamber from which air may be evacuated so that said tier will be supported by the differential in air pressure acting thereon.

References Cited in the file of this patent

UNITED STATES PATENTS

| | | |
|---|---|---|
| 1,304,196 | Noppel | May 20, 1919 |
| 2,578,220 | Billner | Dec. 11, 1951 |
| 2,609,113 | Huffman | Sept. 2, 1952 |
| 2,715,038 | Billner et al. | Aug. 9, 1955 |
| 2,716,497 | Wahl et al. | Aug. 30, 1955 |
| 2,812,061 | Pfister | Nov. 5, 1957 |